(12) United States Patent
Widanagamage Don

(10) Patent No.: US 8,393,975 B2
(45) Date of Patent: Mar. 12, 2013

(54) AUTOMATED DOSE CONTROL FOR ESPRESSO MAKER

(75) Inventor: Lochana Subasekara Widanagamage Don, Botany (AU)

(73) Assignee: Breville Pty Limited, Botany, NSW (AU)

( * ) Notice: Subject to any disclaimer, the term of this patent is extended or adjusted under 35 U.S.C. 154(b) by 1242 days.

(21) Appl. No.: 12/159,852

(22) PCT Filed: Dec. 15, 2006

(86) PCT No.: PCT/AU2006/001909
§ 371 (c)(1),
(2), (4) Date: Jul. 1, 2008

(87) PCT Pub. No.: WO2007/076567
PCT Pub. Date: Jul. 12, 2007

(65) Prior Publication Data
US 2009/0013875 A1    Jan. 15, 2009

(30) Foreign Application Priority Data

Jan. 5, 2006  (AU) ................................ 2006900047

(51) Int. Cl.
*A47J 31/40*    (2006.01)
(52) U.S. Cl. ........................................................ 473/280
(58) Field of Classification Search .................... 99/280, 99/281, 282, 283
See application file for complete search history.

(56) References Cited

U.S. PATENT DOCUMENTS

| | | | | |
|---|---|---|---|---|
| 6,000,317 A | * | 12/1999 | Van Der Meer | 99/282 |
| 2006/0037481 A1 | * | 2/2006 | Bicht | 99/279 |

* cited by examiner

*Primary Examiner* — Raeann Gorden
(74) *Attorney, Agent, or Firm* — Molins & Co.

(57) ABSTRACT

A coffee machine has a flow sensor located upstream of the boiler or thermal block for the purpose of sensing changes in flow rate in a system for automating dose control.

20 Claims, 4 Drawing Sheets

AUTOMATED DOSE CONTROL FOR ESPRESSO MAKER

FIELD OF THE INVENTION

The invention relates to espresso making machines and more particularly to an espresso making machine with automated dose control.

BACKGROUND OF THE INVENTION

Most domestic espresso makers lack an effective way to measure the delivered dosage of brewed coffee. Some machines monitor the flow volume with flow sensors that measure the volume of water pumped into the thermal block or boiler. Operating in this way assumes that the volume pumped into the thermal block or boiler is equal to the volume delivered out of the portafilter into the user's cup. However, this assumption does not always hold. This is because some of the water delivered into the boiler or thermal block ends up as residue or is captured by absorption or other losses taking place in the filter, thermal block or boiler. While it would be more accurate to measure the flow out of the boiler or thermal block, low cost flow sensors are not considered suitable because they are adversely affected by the higher temperatures and contamination associated with the liquid delivery system downstream of the thermal block or boiler.

OBJECTS AND SUMMARY OF THE INVENTION

It is an object of the invention to provide methods and devices for automating dose control in an espresso machine that utilises a flow sensor located upstream of the boiler or thermal block.

It is another object of the invention to provide a coffee machine with a flow sensor located upstream of the boiler or thermal block for the purpose of sensing changes in flow rate in a system for automating dose control.

It is another object of the invention to provide a means for effectively using a low cost flow sensor in a dose controlled espresso maker.

Accordingly, there is provided a dose control system comprising a flow sensor located upstream of a boiler or thermal block in an espresso maker. In preferred embodiments, the flow sensor is located upstream of the pump. In particularly preferred embodiments, the flow sensor and a flow rate monitor are used to determine the volume of coffee delivered by the espresso maker by sensing changes in the flow rate.

BRIEF DESCRIPTION OF THE DRAWING FIGURES

BEST MODE AND OTHER EMBODIMENTS OF THE INVENTION

The basic elements of an espresso maker are a water tank, a water pump, a heating device and a portafilter. For the purposes of the present invention, the heating device may be either a boiler or a thermal block. A portafilter is a filter with a handle. Water is heated in the heating device and then passes through ground coffee contained in the portafilter before exiting the portafilter directly into a container such as a cup. The pump is an important component of the machine because good quality coffee must be brewed under pressure. Pumps in espresso makers that deliver water from the water tank at 15 or 19 bar are not uncommon.

It has been observed that the flow rate of a pump used in an espresso maker is a function of the outlet pressure. Maximum flow rates are achieved at zero pressure or low pressure while minimum flow rates are delivered when the pump is delivering at its highest pressures.

In espresso making machines, the heating device (boiler or thermal block) causes pressure to build up as water is pumped into the system. The liquid output of the heating device is typically regulated by a pressure relief type discharge valve or a microprocessor controlled solenoid. Accordingly, the pressure build up in the espresso making machine is dependant on the state of this discharge valve or a microprocessor controlled solenoid, the amount of coffee used in the portafilter, the degree of tamping of the coffee in the portafilter and the portafilter type.

When a coffee dose is requested by the user, electrical power to the pump causes it to continue to deliver water into the heating device. The pressure accumulates in the heating device until the valve or microprocessor controlled solenoid opens. Once the discharge valve (or solenoid) opens, again the pressure starts to accumulate in the portafilter until build up enough pressure to discharge coffee from the portafilter. Once the system is relatively stable with this pressure, the flow rate will stay relatively constant and the amount of water pumped into the heating device and portafilter will be more or less equivalent to the volume delivered from the portafilter into the cup.

Accordingly, it has been observed that the continuous monitoring of flow rate changes over time indicate the point in time where the espresso making machine begins to discharge and have a stable flow rate. Thus, the onset of stable discharge occurs at a point in time when the flow rate stabilizes. Therefore, processing a signal from a flow sensor to determine flow rate and changes in flow rate over time makes it possible to measure the accurate volume that drips out of the portafilter into the cup even when the flow sensor is located between the water tank and the pump.

Figure 1:
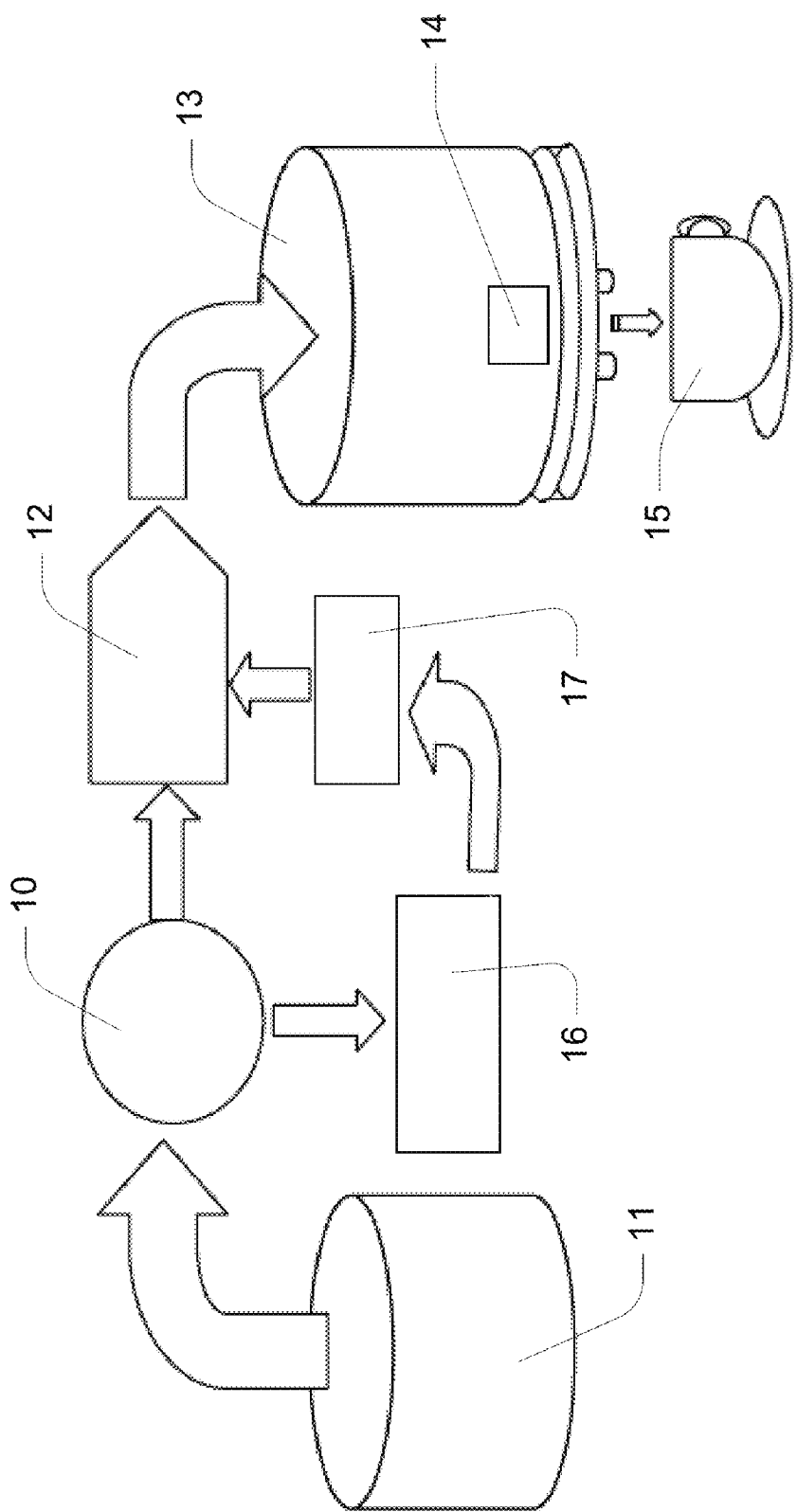
FIG. 1 is a schematic flow chart illustrating a device according to the present invention.

As shown in FIG. 1, low cost flow sensor 10 such as a DIGMESA model 974-8502 is positioned between a source of water such as the water tank 11 and the pump 12 of an espresso maker. In the alternative it may be positioned downstream of the pump, for example in the flow between the pump 12 and the heating device 13. A pump such as an ULKA 19 bar pump is considered typical in this environment. The pump 12 delivers a pressurised stream of water into the heating device 13. The heating device further comprises a discharge or relief valve or microprocessor controlled solenoid 14 that prevents flow into the cup 15 unless the pressure exceeds pre-established limit (about 5 bar) or whenever microprocessor sends signal to open the solenoid. In this embodiment, the flow sensor 10 provides a periodic signal to a flow rate monitor and flow rate integrator or volume counter 16. As will be explained, the flow rate monitor and volume counter 16 supplies a signal to a pump control device or microprocessor 17 that regulates the power supplied to the pump 12. In this embodiment, the flow rate monitor and flow volume counter 16 is in the form of a micro processor that regularly senses and monitors the flow rate over time as measured by the flow sensor 10 at given time intervals.

The micro processor has a sub routine referred to as a timer interrupt sub routine. In this sub routine the micro processor calculates the flow rate difference in two consecutive flow rates within a given time interval. The micro processor determines if the flow rate is stable to within an acceptable tolerance. It does this by taking consecutive flow rate readings, averaging the readings and multiplying the resulting average by a constant which is dependant on the type of flow sensor and the pump used in the device. Thus, the microprocessor is able to compare the instantaneous flow rate with a normal stable flow rate and determine the stability as a percentage of the normal.

The micro processor continuously monitors the flow rate changes between consecutive readings and determines whether or not the flow rate falls within an acceptable tolerance. If the change in flow rate is not within acceptable tolerances, this is interpreted as a significant deviation in the flow rate and the pressure is still increasing within the system. The change in pressure indicates that the delivery valve or microprocessor controlled solenoid 14 is not open or the coffee is not started to discharge from the portafilter and for this reason, deviation of the change in flow rate from the acceptable tolerance causes the flow volume counter 16 to reset to zero.

When the micro processor finds a continuous and stable flow rate, it is interpreted as an indication that the delivery valve or solenoid 14 is open and also internal pressure of the portafilter is reach to the pressure where start to discharge coffee from the portafilter. At this point, the flow volume counter starts to count the flow volume. Once the flow volume has reached a target delivery volume that is set by the user, the flow counter stops and the micro processor shuts down the pump 12. For example, a user requesting a single cup or a single dose of coffee receives a dose of approximately 30 ml of coffee whereas a request for two cups will result in a delivered dosage of 60 ml. The device may be provided with a volume adjustment from which the user may specify or pre-determine a number of doses or a specific volume of delivered liquid coffee.

The above referenced micro processor has another feature which is intended to overcome errors in the delivery volume associated with an initially empty heating device. In the example of an empty heating device and portafilter, the delivery volume 30 ml of water is small when compared to the volumetric capacity of the system. If the device initially starts with a completely empty heating device and portafilter a delivery of 30 ml by the pump into the system may not build up enough pressure in the system to show an obvious drop in the flow rate. Thus, the pump may be operating at full speed and the flow sensor will detect a high, constant flow rate which approximates the flow rate at zero pressure. Thus, the micro processor may not be able to detect a flow rate (or pressure) drop even after pumping 30 ml in the system. As a result, the volume counter 16 may not reset to zero and will reach the target volume, causing the pump to be shut down even though no coffee has exited the portafilter into the cup. To circumvent this problem, the micro processor is configured to store a constant referred to as the X1 (or flow rate constant) value. The X1 value is determined on the basis of the type of pump, the type of flow sensor and the type of heating device and portafilter used. When the flow rate is higher than the X1 constant, the micro processor interprets the flow rate as one associated with negligible pressure and the micro processor thus resets the volume counter to zero. This action prevents the micro processor's volume counter from reaching the target volume prematurely.

Figure 2:
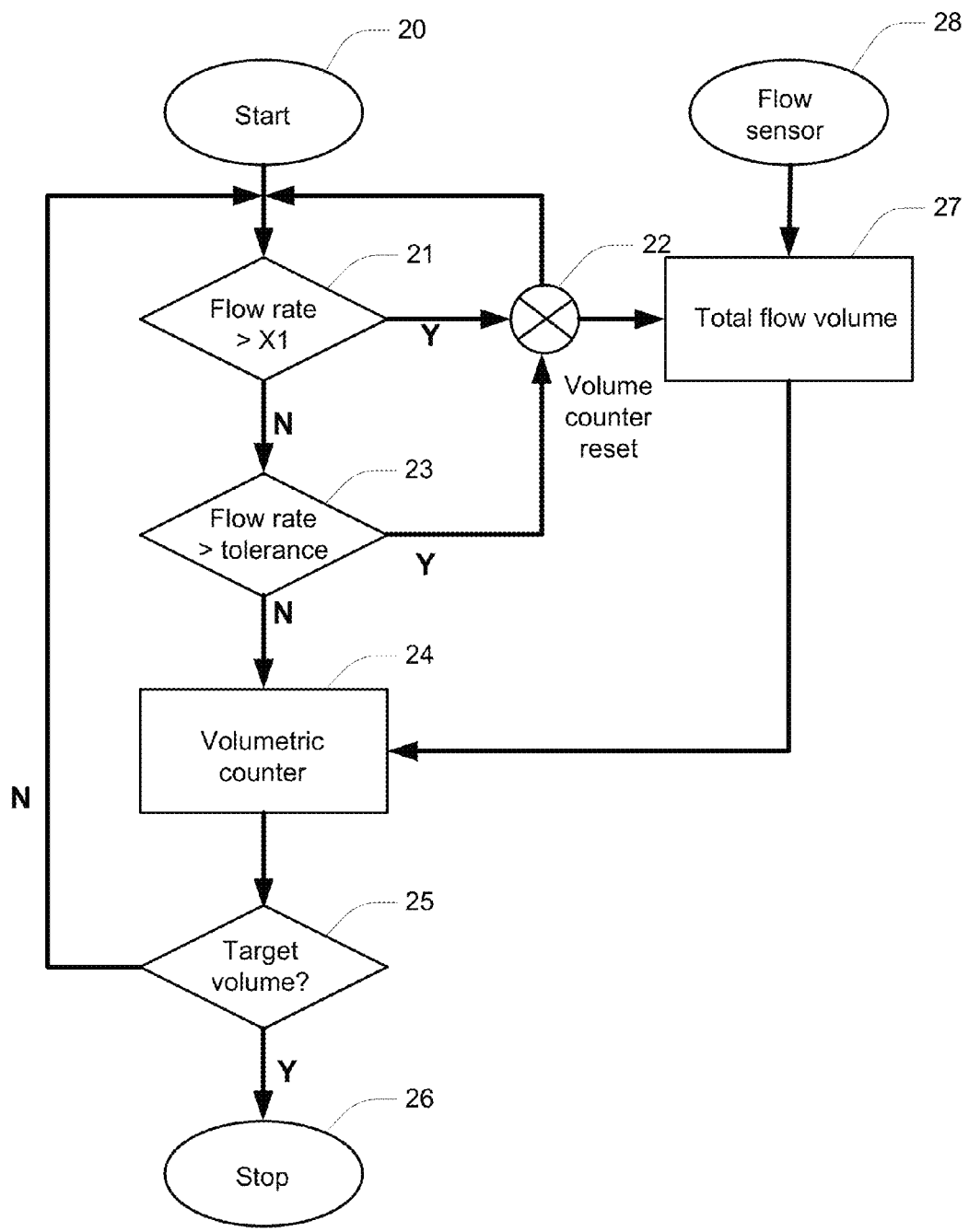
FIG. 2 is a schematic flow chart illustrating a method according to the present invention.

An operational sequence of the main loop of the micro processor is illustrated in FIG. 2. When a user requests that a dosage of coffee be delivered, the micro processor starts the pump 20. Next, the micro processor determines whether or not the flow rate is greater than the X1 constant 21. If the flow rate is greater than the X1 constant, the volume counter is reset 22. If the flow rate is less than the X1 constant, the micro processor determines if the change in flow rate is greater than the acceptable tolerance 23. If the change in flow rate is greater than the acceptable tolerance the volume counter is reset 22. If the change in flow rate is smaller than the tolerance, a reading is taken from the volumetric counter 24. If the reading from the volumetric indicates that the delivered volume is equal to or greater than the target volume 25 then the pump is stopped 26. If the reading of the delivered volume is smaller than the target volume, the micro processor loop returns to that point where the flow rate is compared to the X1 rate constant or value 21. Note that when the volumetric counter is reset 22, the real time volumetric counter renews its count of the total flow volume 27 based on the output of the digital flow sensor 28. The output of the real time counter is supplied to the microprocessor 24 at a point before the volume is compared to the target value 25. The real time volume counter may be separate to or integral with the microprocessor or pump control device.

Figure 3:
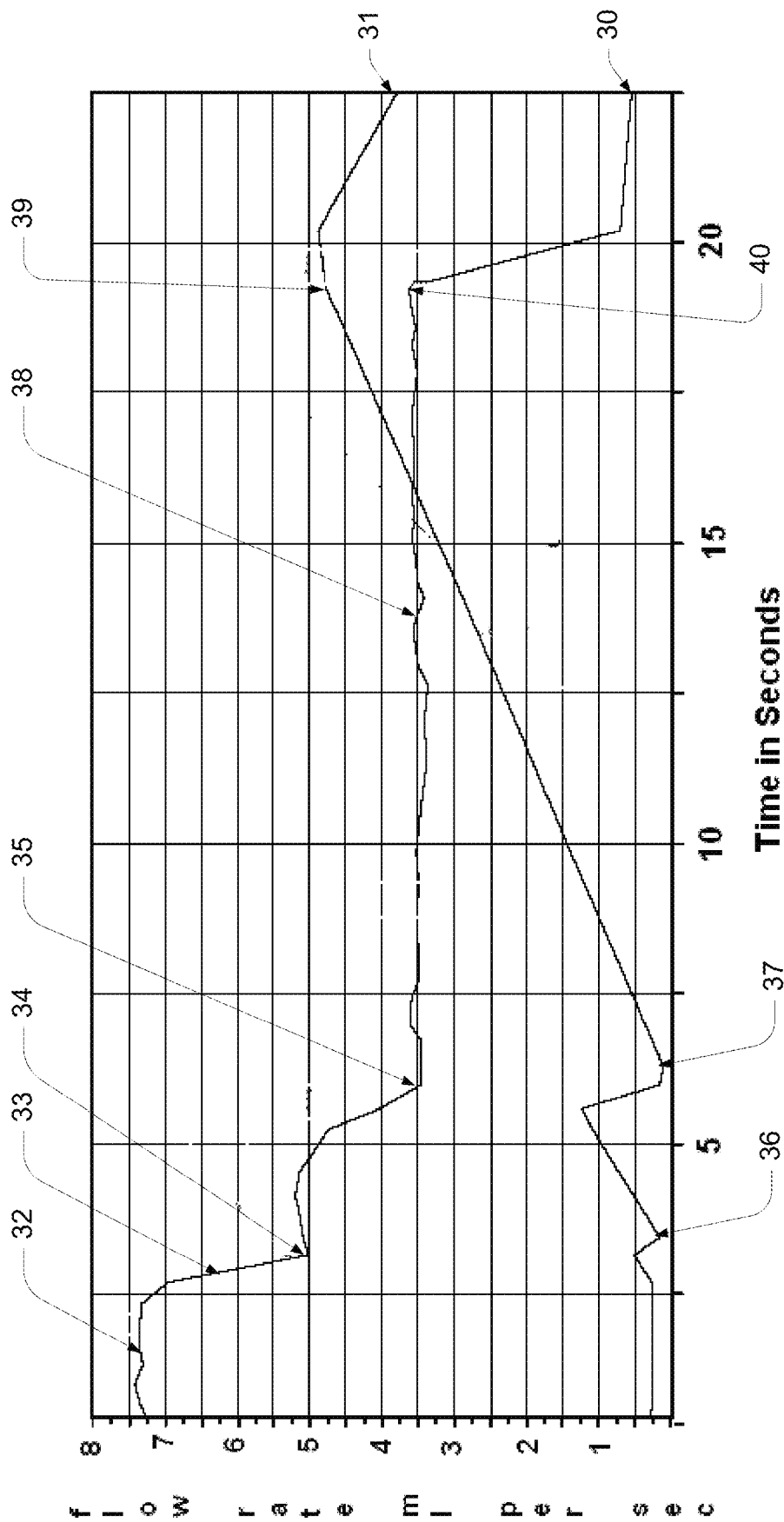
FIG. 3 is a graph illustrating changes in flow rate and delivery volume over time when using a boiler.

FIG. 3 illustrates measurements (taken over a 25 second interval) of the flow rate 30 as measured by a flow sensor together with the measure flow volume as determined by the flow sensor 10 rate monitor and flow volume counter 16 disclosed with reference to FIG. 1. The measurements contained in this illustration were made on an espresso making machine with an 18 bar pump and a 150 cc boiler. At the beginning of the measurement process, the boiler was empty. As shown in FIG. 3, the flow rate is initially high 32 as the boiler fills. There is no volumetric counting because the X1 value is too high. As the boiler continues to fill, the flow rate begins to drop off 33 until such time as the delivery valve 14 opens 34. The flow rate initially stabilises, then decreases until such time 35 as coffee begins to exit the portafilter. Note that the flow volume counter resets to zero, first 36 when the delivery valve 14 opens and again 37 when coffee begins to exit the portafilter. After this point in time, the flow sensor and hence the volume counter continue to deliver readings to the micro processor while the system is in a stable flow rate regime 38. Once the target volume 39 is reached, the pump is shut down and the flow rate drops off 40 as expected. Note that unacceptable changes in flow rate just prior to the opening of the discharge valve 34 and just prior to the beginning of discharge from the portafilter 35 cause the resetting 36, 37 of the volume flow counter.

Figure 4:
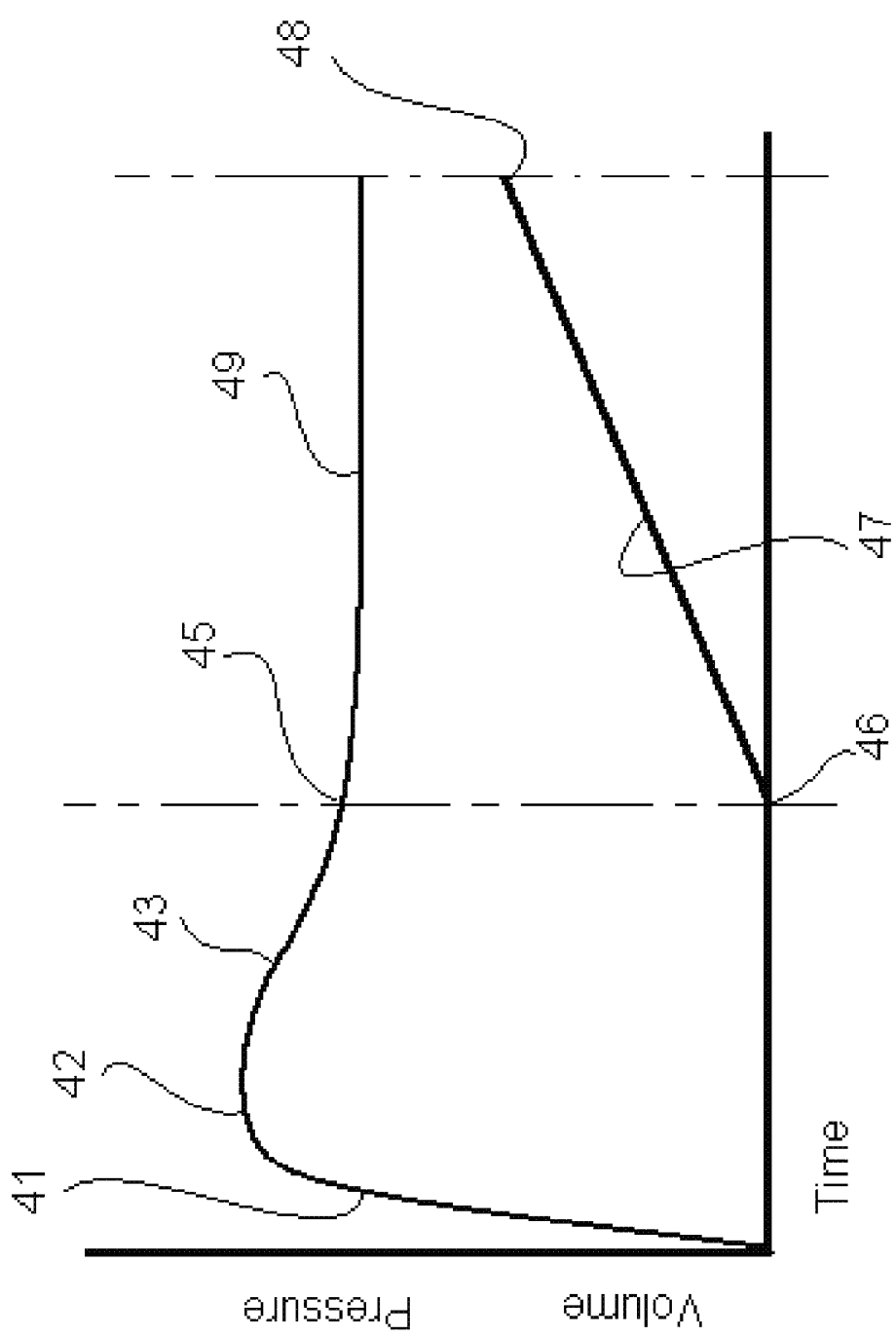
FIG. 4 is a graph illustrating changes in flow rate and delivery volume over time when using a thermal block.

FIG. 4 illustrates measurements taken over a 23 second interval of the actual flow rate as measured by a flow sensor together with the measure flow volume as determined by the flow sensor lo rate monitor and flow volume counter 16 disclosed with reference to FIG. 1. The measurements contained in this illustration were made on an espresso making machine with a 15 bar pump and a thermal block. At the beginning of the measurement process, the thermal block and the portafilter are empty. As shown in FIG. 4, once the pump starts 41 the flow rate is high, reaching a relatively stable maximum 42 as the thermal block and portafilter fills. There is no volumetric counting because the X1 value is too high. The flow rate initially stabilizes, then as the system continues to fill, the flow rate begins to drop off 43 until such time as the coffee starts exit from the portafilter 45. Note that the flow volume counter resets to zero 46, until the flow rate is relatively stable 45 at a value less than X1.

After this point in time, the flow sensor and hence the volume counter continue to deliver readings to the micro processor while the system is in a stable flow rate regime 49. Once the target volume 48 is reached, the pump is shut down. The pump control device shuts the pump off when the user selected volume or number of selected doses is equal to the volume delivered as determined by the above methods and hardware. Note that unacceptable changes in flow rate just prior to the stable interval signalling the beginning of discharge from the portafilter 45 may cause the resetting 46 of the volume flow counter.

While the invention has been disclosed with reference to particular details of construction, these should be understood as having been provided by way of example and not as limitations to the scope or spirit of the invention.

What is claimed is:

1. An espresso making device, comprising:
   a source of water;
   a heating device;
   a portafilter;
   a water pump;
   a flow sensor for measuring a flow rate;
   the pump delivering the flow to the heating device;
   a microprocessor controlling the pump, the microprocessor receiving an output of the flow sensor and determining from the output, a change in the flow rate;
   the microprocessor adapted to determine a volume delivered by the pump through the portafilter based on changes in a flow rate stability over time and shut off the pump when a target volume has been discharged from the portafilter.

2. The device of claim 1, wherein:
   the heating device is a thermal block.

3. The device of claim 1, wherein the heating device is a boiler.

4. The device of claim 1, wherein:
   the microprocessor is adapted to start to measure the volume delivered by the pump through the portafilter based on a determination that there is a stable flow rate.

5. The device of claim 4, wherein:
   the microprocessor is programmed with a flow rate constant and resets a volume computation to zero, if the flow rate is above that constant.

6. The device of claim 1, wherein:
   a deviation in the flow rate from a predetermined tolerance causes a flow volume counter in the microprocessor to reset to zero.

7. The device of claim 6, wherein:
   the flow sensor is located between the source of water and the pump.

8. The device of claim 1, wherein:
   the source of water is a tank within the device.

9. A method for determining the volume of coffee delivered by an espresso machine having a source of water, a portafilter, a water pump, a flow sensor located between the source of water and the pump, the pump delivering a flow of water to a heating device, a microprocessor controlling the pump, comprising the steps of:
   using the microprocessor to receive an output of the flow sensor and determine from the output and time, a flow rate;
   using the microprocessor to determine a volume delivered by the pump through the portafilter based on changes in the flow rate and time and shut off the pump when a target volume has been discharged from the portafilter.

10. The method of claim 9, wherein:
    the microprocessor is adapted to determine the volume delivered by the pump through the portafilter based on a determination that there is a stable flow rate.

11. The method of claim 9, wherein:
    the microprocessor is programmed with a flow rate constant and resets a volume computation to zero, if the flow rate is above that constant.

12. The method of claim 9, wherein:
    a deviation in the flow rate from a predetermined tolerance causes a flow volume counter in the microprocessor to reset to zero.

13. The method of claim 9, wherein:
    the target volume is selectable by a user as either one dose or two doses of coffee through the portafilter.

14. The device of claim 1, wherein:
    the flow sensor is located between the pump and the source of water.

15. The device of clam 1, wherein:
    the flow sensor is located between the pump and the heating device.

16. The device of claim 1, wherein:
    the target volume is selectable by a user as a measured volume of coffee through the portafilter.

17. The device of claim 4, wherein:
    a deviation in the flow rate from a predetermined tolerance causes a flow volume counter in the microprocessor to reset to zero.

18. The device of claim 4, wherein:
    the target volume is selectable by a user as either one dose or two doses of coffee through the portafilter.

19. The method of claim 10, wherein:
    the microprocessor is programmed with a flow rate constant and resets a volume computation to zero, if the flow rate is above that constant.

20. The method of claim 10, wherein:
    a deviation in the flow rate from a predetermined tolerance causes a flow volume counter in the microprocessor to reset to zero.

* * * * *